United States Patent
Huang

(10) Patent No.: US 9,433,978 B2
(45) Date of Patent: Sep. 6, 2016

(54) OPTIC CONNECTOR CLEANING APPARATUS

(71) Applicant: HOBBES & CO., LTD., New Taipei (TW)

(72) Inventor: Yen-Chang Huang, New Taipei (TW)

(73) Assignee: Hobbes & Co., Ltd., New Taipei (TW)

( * ) Notice: Subject to any disclaimer, the term of this patent is extended or adjusted under 35 U.S.C. 154(b) by 505 days.

(21) Appl. No.: 13/970,201

(22) Filed: Aug. 19, 2013

(65) Prior Publication Data
US 2014/0259477 A1 Sep. 18, 2014

(30) Foreign Application Priority Data
Mar. 18, 2013 (TW) .............................. 102109460 A

(51) Int. Cl.
| | |
|---|---|
| A47L 25/00 | (2006.01) |
| B08B 11/00 | (2006.01) |
| B08B 1/00 | (2006.01) |
| G02B 6/38 | (2006.01) |
| B65H 57/26 | (2006.01) |
| B65H 75/44 | (2006.01) |

(52) U.S. Cl.
CPC .................. *B08B 1/00* (2013.01); *A47L 25/00* (2013.01); *B08B 11/00* (2013.01); *B65H 57/26* (2013.01); *B65H 75/4452* (2013.01); *B65H 75/4471* (2013.01); *G02B 6/3866* (2013.01); *B65H 2701/37* (2013.01)

(58) Field of Classification Search
CPC ...... A47L 25/00; B08B 11/00; G02B 6/3866
See application file for complete search history.

(56) References Cited

U.S. PATENT DOCUMENTS

| | | | | |
|---|---|---|---|---|
| 5,735,013 | A * | 4/1998 | Yaguchi | B08B 1/008 15/104.04 |
| 6,619,857 | B2 * | 9/2003 | Miyake | G02B 6/25 15/210.1 |
| 7,971,304 | B2 * | 7/2011 | Kida | B08B 11/00 15/210.1 |
| 8,074,316 | B2 * | 12/2011 | Blair | B08B 1/00 15/104.94 |

* cited by examiner

*Primary Examiner* — Randall Chin
(74) *Attorney, Agent, or Firm* — Rosenberg, Klein & Lee

(57) ABSTRACT

An optic connector cleaning apparatus includes a driving assembly, a cleaning tape and a casing. The driving module includes a reel assembly. The cleaning tape includes a first surface and a second surface opposite the first surface, the cleaning tape winds at the reel assembly; the casing includes an inverting structure and a cleaning region. The cleaning tape winds about the inverting structure. The first surface of the cleaning tape is exposed to the cleaning region, the cleaning tape winds about the inverting structure to expose the second surface through the cleaning region.

22 Claims, 18 Drawing Sheets

OPTIC CONNECTOR CLEANING APPARATUS

BACKGROUND OF THE INVENTION

1. Field of the Invention

The instant disclosure relates to an optic connector cleaning apparatus; in particular, to a cleaning apparatus which uses a double-sided cleaning tape structure.

2. Description of Related Art

In order to prevent dust from affecting the quality of signal transmission between an optic connector and another optic connector in connection, a cleaning apparatus especially used for cleaning optic connectors is first applied before wiring is laid out. Specifically, the outer surface of the connector is cleaned to minimize the possibility of dust contamination.

A rotational cleaning apparatus for optic connector has a rotational mechanism, a cleaning tape, and a casing which encloses the rotational mechanism and the cleaning tape. The cleaning tape partially exposed from the casing such that the connector can be cleaned by frictional contact with the cleaning tape. The cleaning tape is rotably delivered by the rotational mechanism such that the portions of the cleaning tape which is exposed are constantly replaced. However, the conventional connector cleaners only expose one side of the cleaning tape from the casing, which is quite wasteful when two sides of the cleaning tape could be used for cleaning.

To address the above issues, the inventor strives via associated experience and research to present the instant disclosure, which can effectively improve the limitation described above.

SUMMARY OF THE INVENTION

The object of the instant disclosure is to provide a optic connector cleaning apparatus using a double-sided cleaning tape.

In order to achieve the aforementioned objects, according to an embodiment of the instant disclosure, an optic connector cleaning apparatus includes a driving module, a cleaning tape, and a housing. The driving module includes a reel assembly. The cleaning tape includes a first surface and a second surface opposite from the first surface. The cleaning tape is partially wound about the reel assembly. The housing includes an inverting structure and a cleaning region. The cleaning tape is also partially wound about the inverted structure. The first surface of the cleaning tape partially exposes from the cleaning region, and the cleaning tape is partially wound about the inverting structure such that the second surface of the cleaning tape partially exposes from the cleaning region. As a result, the instant disclosure provides double-sided cleaning.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

The aforementioned illustrations and detailed descriptions are exemplarities for the purpose of further explaining the scope of the instant disclosure. Other objectives and advantages related to the instant disclosure will be illustrated in the subsequent descriptions and appended drawings.

Figure 1:
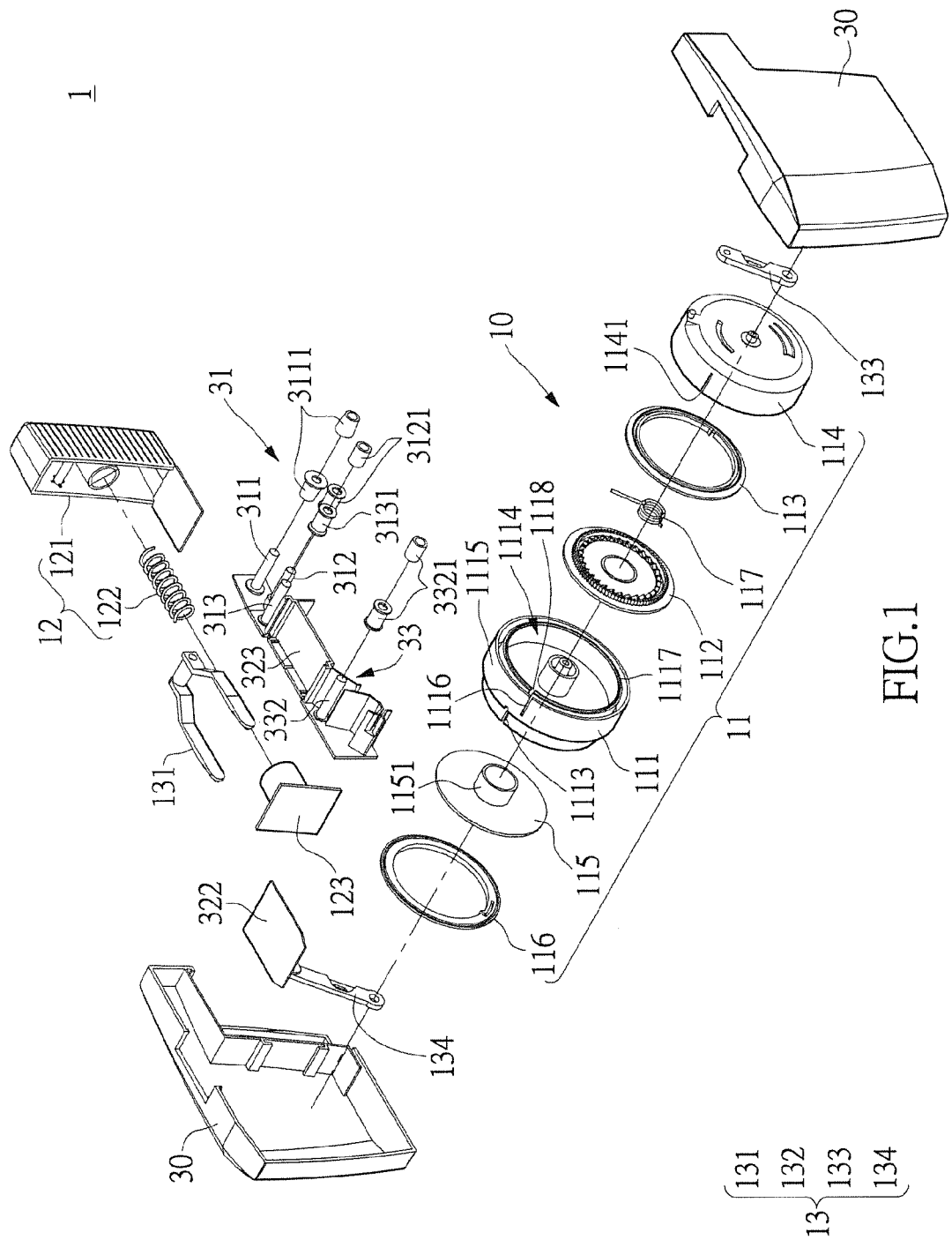
FIG. 1 is an exploded view of an optic connector cleaning apparatus in accordance with the instant disclosure.

FIG. 1 is an exploded view of an optic connector cleaning apparatus in accordance with the instant disclosure. Please refer to FIG. 1, the optic connector cleaning apparatus 1 includes a driving module 10, a cleaning tape 20 (please refer to FIG. 4), and a casing 30. The driving module 10 is housed in the casing 30, and the cleaning tape 20 is housed in the driving module 10.

Figure 2:
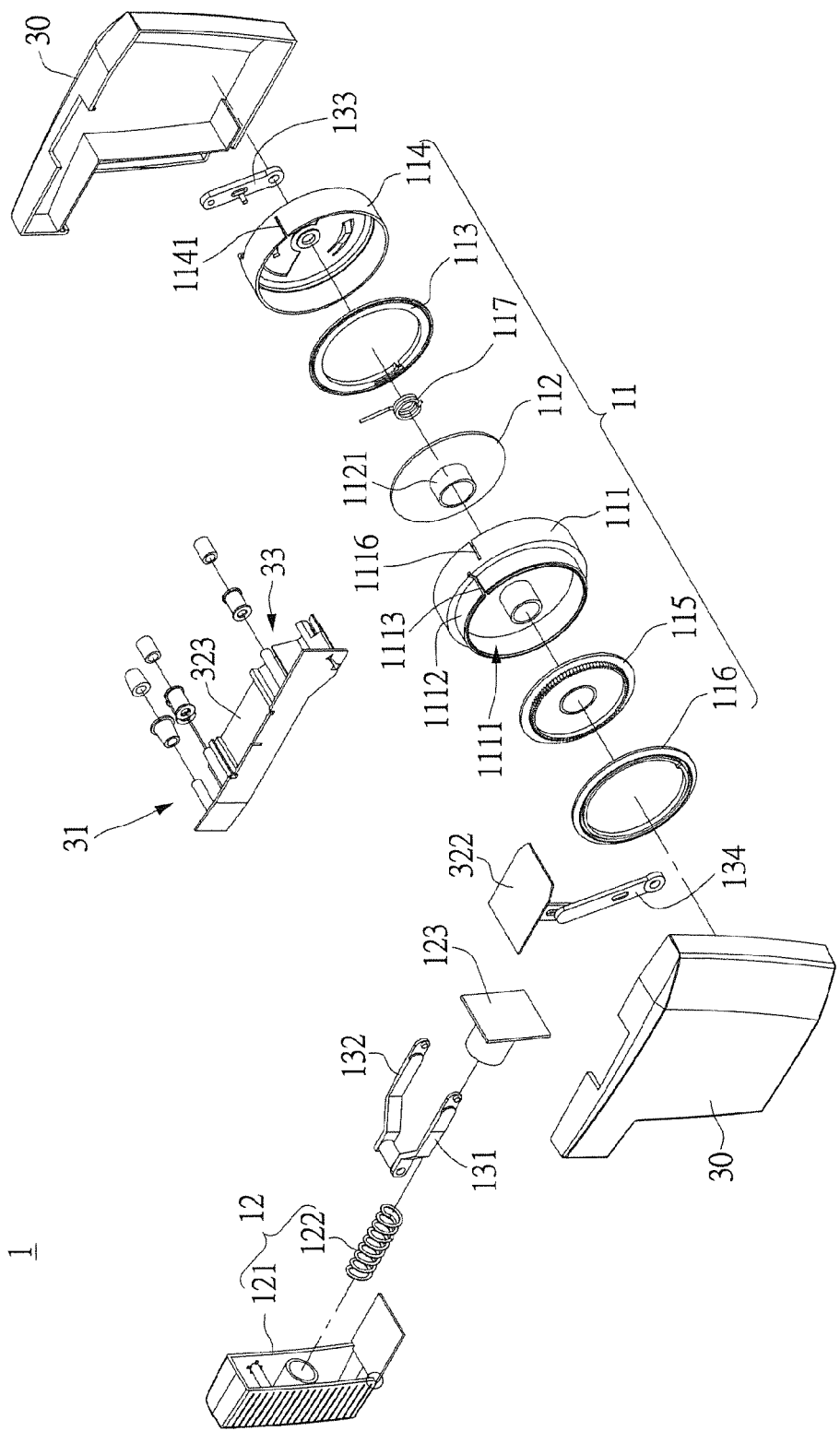
FIG. 2 is another exploded view of the optic connector cleaning apparatus in accordance with the instant disclosure.

FIG. 2 is another exploded view of the optic connector cleaning apparatus in accordance with the instant disclosure.

Please refer to FIGS. 1 and 2. The driving module 10 includes a reel assembly 11, a pressable portion 12, and a linkage structure 13. The reel assembly includes a housing 111, a driving gear 112, a driving ring 113, a cover 114, a fixing gear 115, a fixing ring 116, and a torsional spring 117. The reel assembly 11 is also defined with an axis 11c.

Two sides of the housing 111 are respectively defined with a supply slot 1111 and a return slot 1114. One end of the cleaning tape 20 is stored in the supply slot 1111 and another end of the cleaning tape 20 is stored in the return slot 1114. The supply slot 1111 is defined by a bottom wall and an outer wall 1112 to prevent dust from flowing into the supply slot 1111. The return slot 1114 is defined by the bottom wall, an outer wall 1115 and an inner wall 1117. The outer wall 1115 and the inner wall 1117 are spaced by a gap such that the outer and the inner wall 1115, 1117 are concentric. Dusts are trapped in the gap between the outer wall 1115 and the inner wall 1117 such that dusts are relatively less prone to flow into the return slot 1114 and the supply slot 1111, and thus, the cleaning tape 20 is prevented from contamination.

Figure 3:
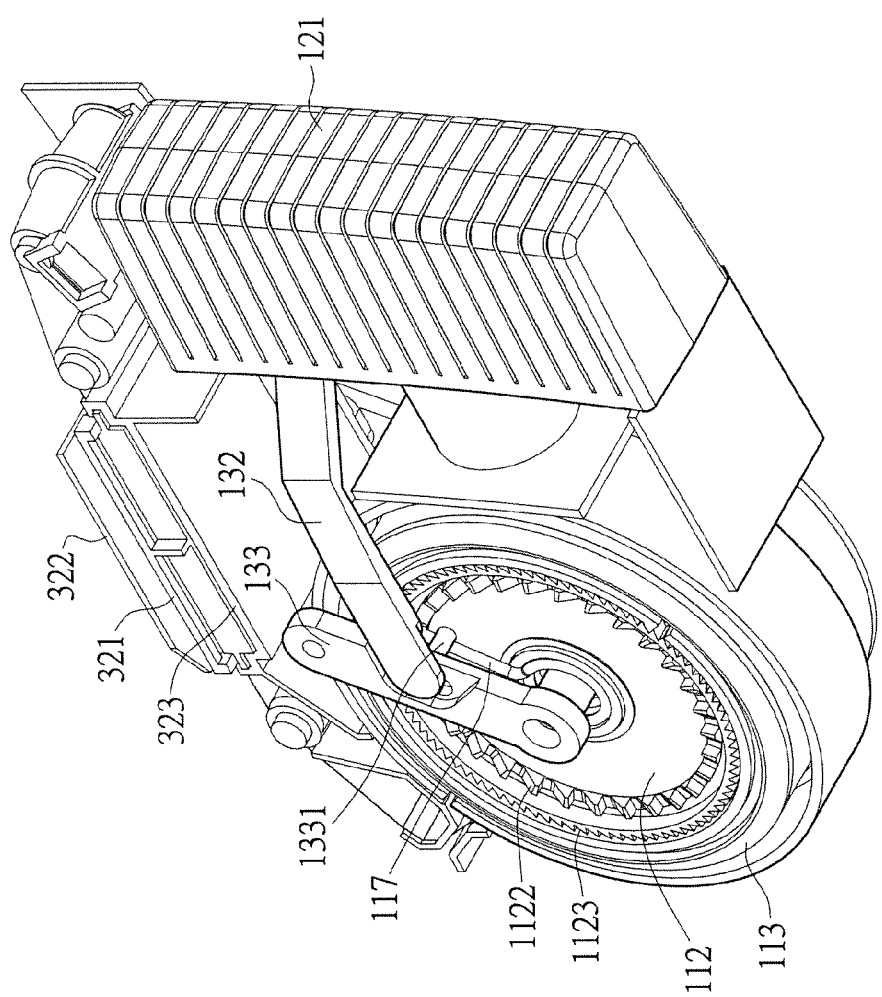
FIG. 3 is a perspective view of the optic connector cleaning apparatus illustrating a first mode in accordance with the instant disclosure.

FIG. 3 is a perspective view of the optic connector cleaning apparatus illustrating a first mode in accordance with the instant disclosure. Please refer to FIG. 3. The driving gear 112 and the driving ring 113 jointly enclose the return slot 1114 of the housing 111. The driving ring 113 abuts a top edge of the inner wall 1117. A surface of the driving gear 112 facing away from the return slot 1114 is arranged with a plurality of inner teeth 1122 and a plurality of outer teeth 1123 thereon. The inner teeth 1122 and the outer teeth 1123 are arranged concentrically with respect to each other. A surface opposite to the inner teeth 1122 is arranged with a winding shaft 1121. One end of the cleaning tape 20 is wound about the winding shaft 1121 of the driving gear 112. The driving ring 113 is disposed around the outer edge of the driving gear 112, and the inner edge of the driving ring 113 is uni-directionally mated with the outer teeth 1123 to constrain the rotational direction of the driving gear 112. One end of the torsional spring 117 is uni-directionally mated with the inner teeth 1122 and the other end of the torsional spring 117 is fixed in the return slot 1114.

Figure 4:
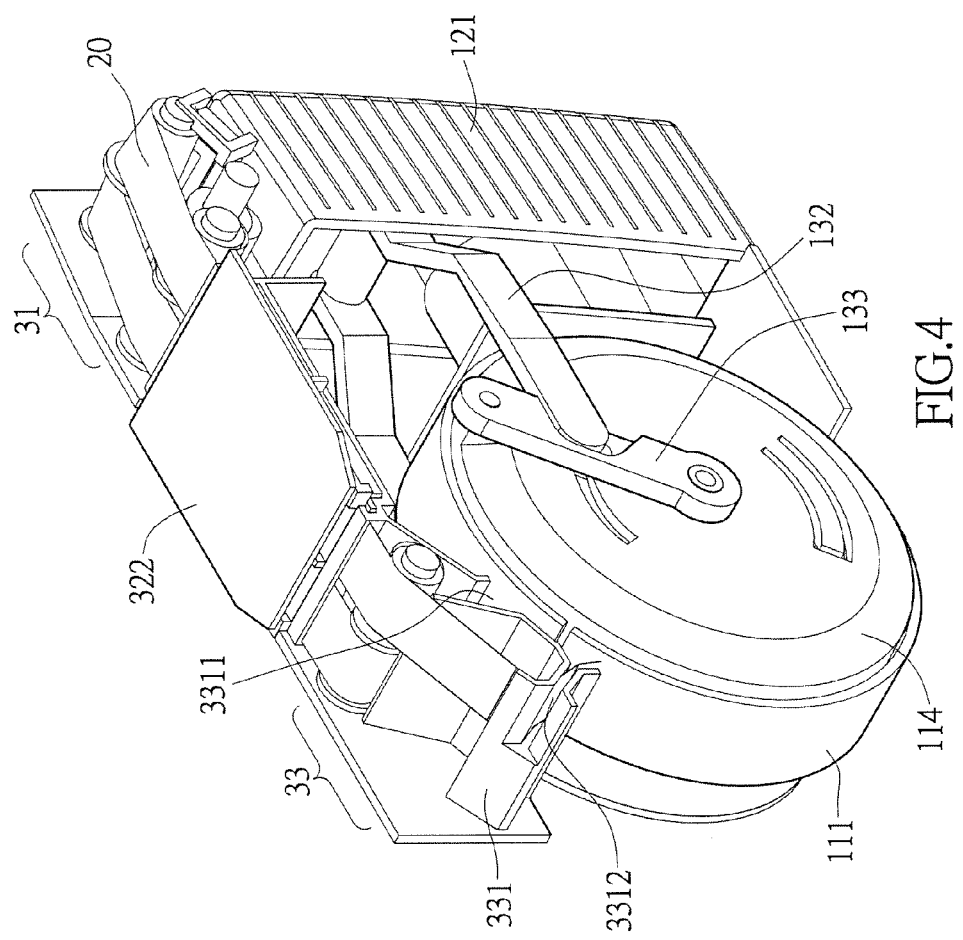
FIG. 4 is another perspective view of the optic connector cleaning apparatus illustrating the first mode in accordance with the instant disclosure.

FIG. 4 is another perspective view of the optic connector cleaning apparatus illustrating a first mode in accordance with the instant disclosure. Please refer to FIGS. 1, 3, 4 and 5. The cover 114 has a slit formed thereon and portions of the cover 114 can rotably disposed between the outer wall 1115 and the inner wall 1117 about the reel axis 11c such that the cover 114 reduces dust contamination of the driving gear 112, driving ring 113, and the return slot 1114, and provides fixed length operation of the cleaning tape 20, which is disclosed later.

Figure 5:
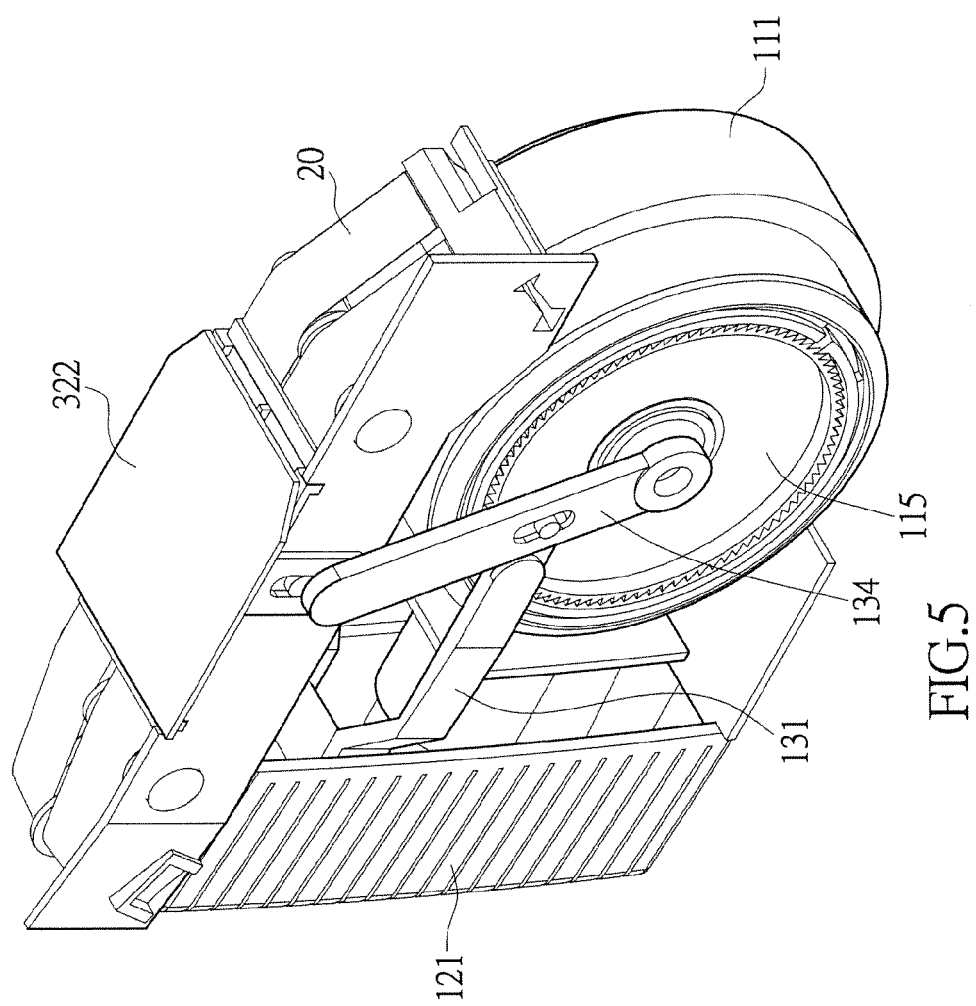
FIG. 5 is another perspective view of the optic connector cleaning apparatus illustrating the first mode in accordance with the instant disclosure.

FIG. 5 is another perspective view of the optic connector cleaning apparatus illustrating the first mode in accordance with the instant disclosure. Please refer to FIGS. 2 and 5. The fixing gear 115 and the fixing ring 116 jointly enclose the supply slot 1111. The fixing ring 116 abuts the top edge of the outer wall 1112 of the supply slot 1111. A surface of the fixing gear 115, which orients towards the supply slot 1111, has a winding shaft 1151 arranged thereon. The other end of the cleaning tape 20 is wound about the winding shaft 1151 of the fixing gear 115. The fixing ring 116 is disposed around the outer edge of the fixing gear 115, and the inner edge of the fixing ring 116 is directionally mated with the fixing gear 115 to constrain the rotational direction of the fixing gear 115.

Please refer to FIG. 1. The pressable portion 12 includes a key 121, an elastic body 122, and a spacer 123. One end of the elastic body 122 abuts the key 121, the other end of the elastic body 122 abuts a surface of the spacer 123, and the other surface of the spacer 123 abuts the outer wall 1115 of the housing 111.

Please refer to FIG. 1. The linkage structure 13 includes a first swing arm 131, a second swing arm 132, a linkage 133 and a shielding linkage 134. Please refer to FIGS. 1, 4 and 5. The first swing arm 131 and the shielding linkage 134 are configured proximate to the fixing gear 115 of the reel assembly 11, and the second swing arm 132 is configured proximate to the driving gear 112 of the reel assembly 11.

Figure 9:
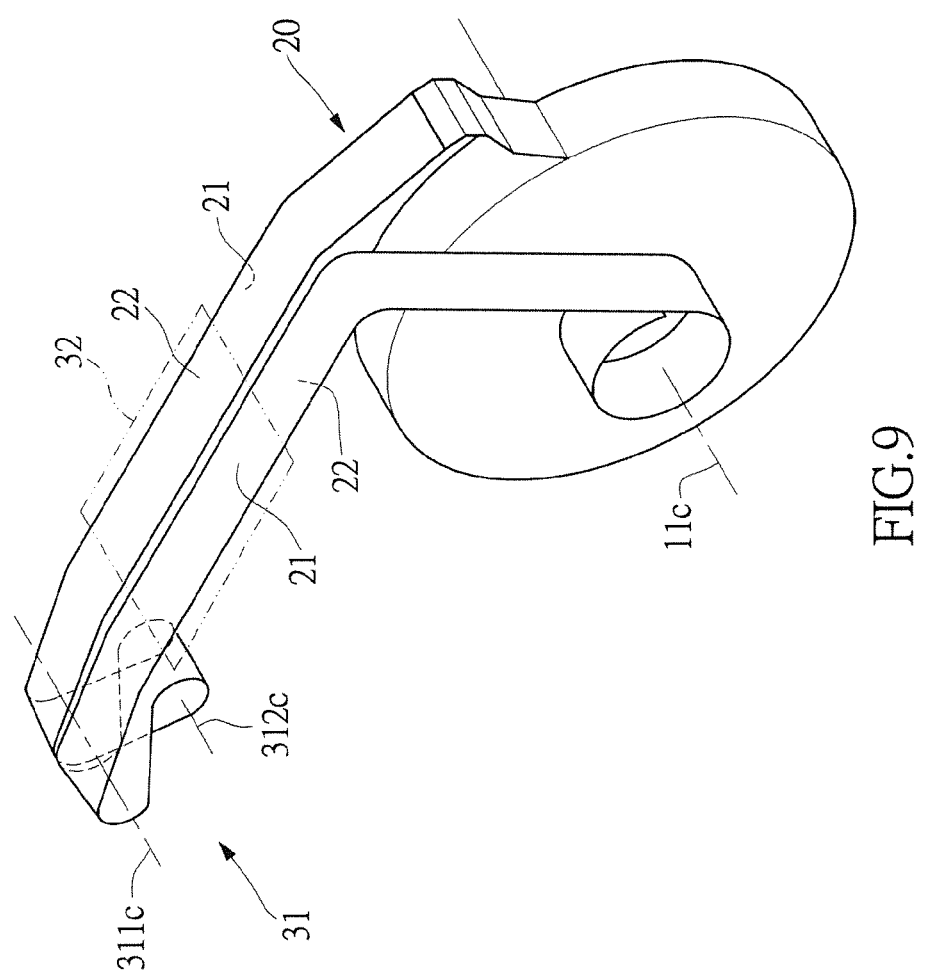
FIG. 9 is a perspective view of the optic connector cleaning apparatus illustrating a cleaning tape in accordance with the instant disclosure.

Please refer to FIGS. 1, 3, and 4. One end of the linkage 133 is disposed at the reel axis 11c of the reel assembly 11 and can rotate about the reel axis 11c (as shown in FIG. 9). The other end of the linkage 133 is disposed on the cover 114 such that the linkage 133 can drive the cover to rotate. One end of the second swing arm 132 is coupled to the key 121, and the other end of the second swing arm 132 abuts the linkage 133. Please refer to FIG. 3. One end of the linkage 133 has a sub-linkage 1331, and the sub-linkage 1331 is advanced through the cover 114 and abuts the torsional spring 117.

Please refer to FIGS. 1 and 5. One end of the shielding linkage 134 is disposed at the reel axis 11c of the reel assembly 11 and can rotate about the reel axis 11c (as shown in FIG. 9). The other end of the shielding linkage 134 is rotably disposed about the casing 30. Further explanation regarding the connection between the shielding linkage 134 and the casing 30 are provided below. One end of the first swing arm 131 is coupled to the key 121, and the other end of the first swing arm 131 abuts the shielding linkage 134.

Please refer to FIGS. 1 and 4. The casing 30 includes an inverting structure 31, a cleaning region 32, and a guiding structure 33. The inverting structure 31 and the guiding structure 33 are respectively configured at two ends of the cleaning region 132. The inverting structure 31 includes a first post 311, a second post 312, and a support post 313. The support post 313 is proximate to the cleaning region 32, the first post 311 is distal from the cleaning region 32, and the second post 312 is configured between the support post 313 and the first post 311. (The first post 311 is divided into two half segments along the plane normal to the axis of the first post 311). The two half segments of the first post 311 are each sleeved with a first bushing 3111. The two first bushings 3111 mentioned above each has a larger radius and a smaller radius. The two first bushings 3111 are coupled to each other at the larger radii. In other words, the radii of two half segments of the first post 311 towards the inner ends (the ends of the bushings with larger radii) appears to have larger radii than the radii towards the outer ends (the ends of the bushings with smaller radii). The second post 312 has a set of second bushings 3121 sleeved thereon. The support post 313 has a post bushing 313 sleeved thereon. With the configuration of the bushings 3121, 3131, 3321, friction is reduced when the cleaning tape 20 winds about the second post 312, the support post 313, and a guiding post 332 of the guiding structure 33. The first bushing 3111 of the first post 311 can reduce friction. Moreover, due to the slanted angle design of the first bushing 3111, the advancing direction of the cleaning tape is slightly modified to facilitate the advancement of the cleaning tape 20 thereafter.

Figure 6:
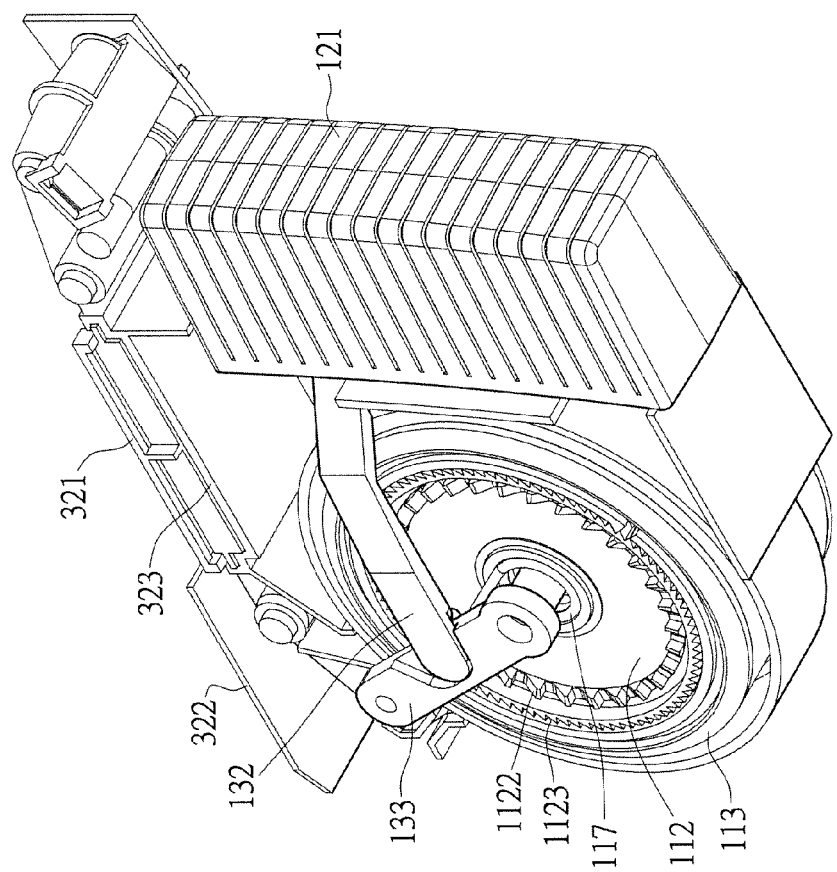
FIG. 6 is a perspective view of the optic connector cleaning apparatus illustrating a second mode in accordance with the instant disclosure.
Figure 7:
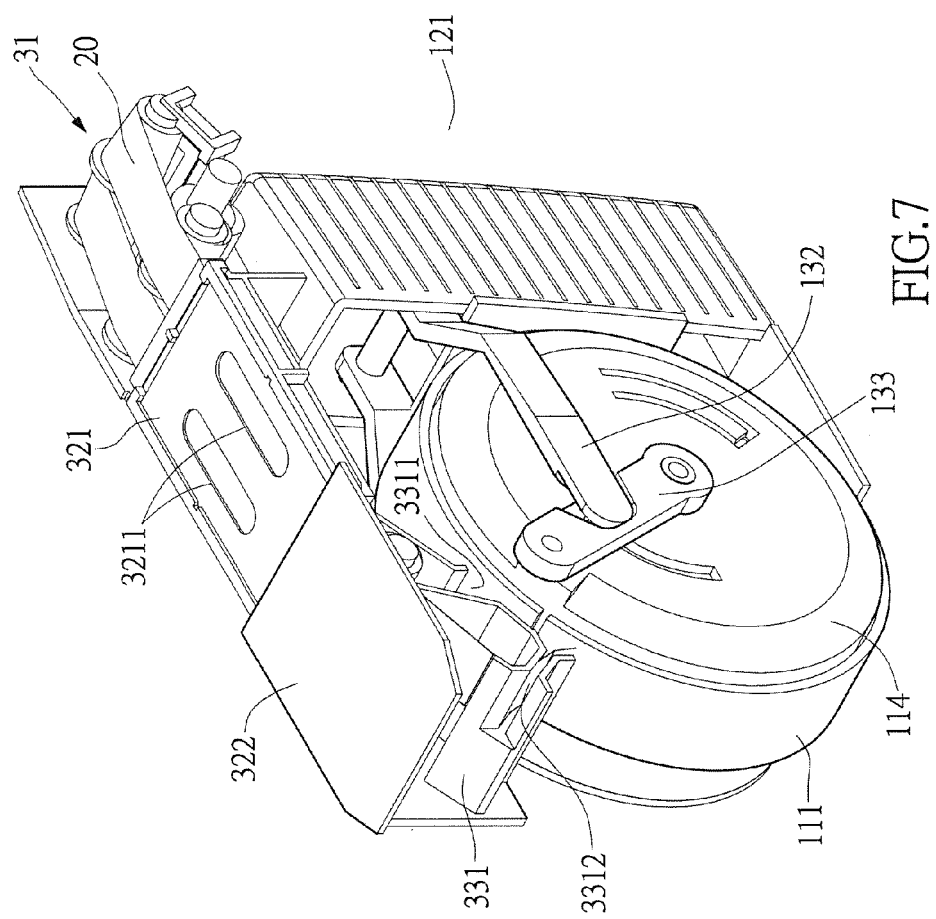
FIG. 7 is another perspective view of the optic connector cleaning apparatus illustrating the second mode in accordance with the instant disclosure.
Figure 8:
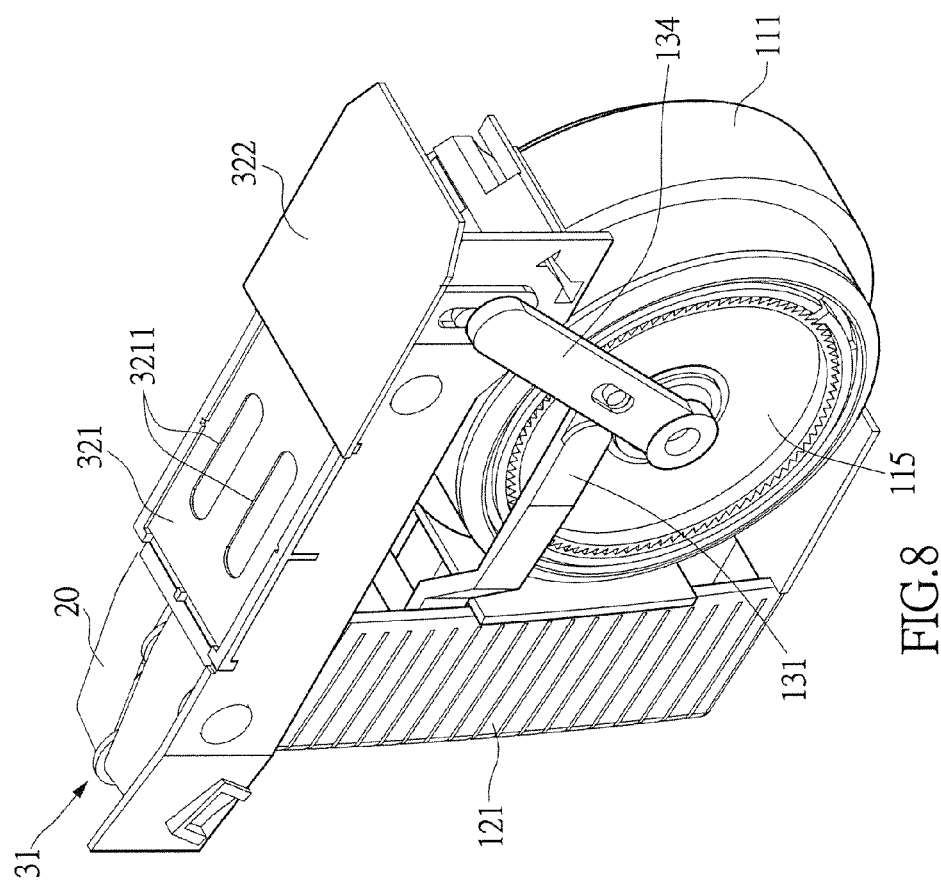
FIG. 8 is another perspective view of the optic connector cleaning apparatus illustrating the second mode in accordance with the instant disclosure.

FIG. 6 is a perspective view of the optic connector cleaning apparatus illustrating a second mode in accordance with the instant disclosure. FIG. 7 is another perspective view of the optic connector cleaning apparatus illustrating the second mode in accordance with the instant disclosure. FIG. 8 is another perspective view of the optic connector cleaning apparatus illustrating the second mode in accordance with the instant disclosure. Please refer to FIGS. 1, and 6 through 8. The cleaning region 32 includes a fixed plate 321, a shielding 322, and a frame 323. The frame 323 is disposed on a surface of the fixed plate 321 which is oriented towards the housing 111. The shielding 322 can be movably disposed on a surface of the fixed plate 321 which is oriented away from the housing 111. One side of the shielding 322 can rotably couple to the other end of the shielding linkage 134. The fixed plate 321 has two openings 3211 arranged on two sides of the fixed plate 321 in parallel. The cleaning tape 20 is partially disposed between the fixed plate 321 and the frame 323 such that the cleaning tape 20 is exposed through the two openings 3211. The shielding 322 can be movably disposed on the fixed plate 321 such that the shielding 322 can be displaced above the fixed plate 321 ("above" is the direction as shown in figures) to prevent the cleaning tape 20 from exposing through the openings 3211 and become contaminated when the cleaning apparatus 1 is not in use. When the cleaning apparatus 1 is in use, the shielding 322 can be displaced beside the fixed plate 321 such that the cleaning tape 20 is exposed through the openings 3211. When the shielding 322 is displaced above, or covers, the fixed plate 321, such mode is defined as the "first mode". When the shielding 322 is displaced beside the fixed plate 321, such mode is defined as the "second mode".

The two openings 3211 of the fixed plate 321 facilitate cleaning of the tip of the optic connector. The optic connector tip (ferrule end) is cleaned via frictional contact with the cleaning tape 20 and is positioned in one direction through one of the openings 3211. Then the optic connector tip is cleaned via tilting the connector tip (ferrule end) by a 90-degree angle and frictional contact with the cleaning tape 20 through the other opening 3211.

Please refer to FIGS. 1 and 4. The guiding structure 33 includes a divider 331 and the guiding post 332. The guiding post 332 is configured proximate to an end of the cleaning region 32, and the divider 331 is distal from the cleaning region 32. The divider 331 and the guiding post 332 form a first guiding inlet 3311 therebetween. The divider 331 has a second guiding post 332 formed thereon. The guiding post 332 has a guide bushing 3321 sleeved thereon.

FIG. 9 is a perspective view of the optic connector cleaning apparatus illustrating the cleaning tape 20 in accordance with the instant disclosure. Please refer to FIG. 9. The cleaning tape 20 has two opposite surfaces defined as a first surface 21 and a second surface 22.

Figure 10:
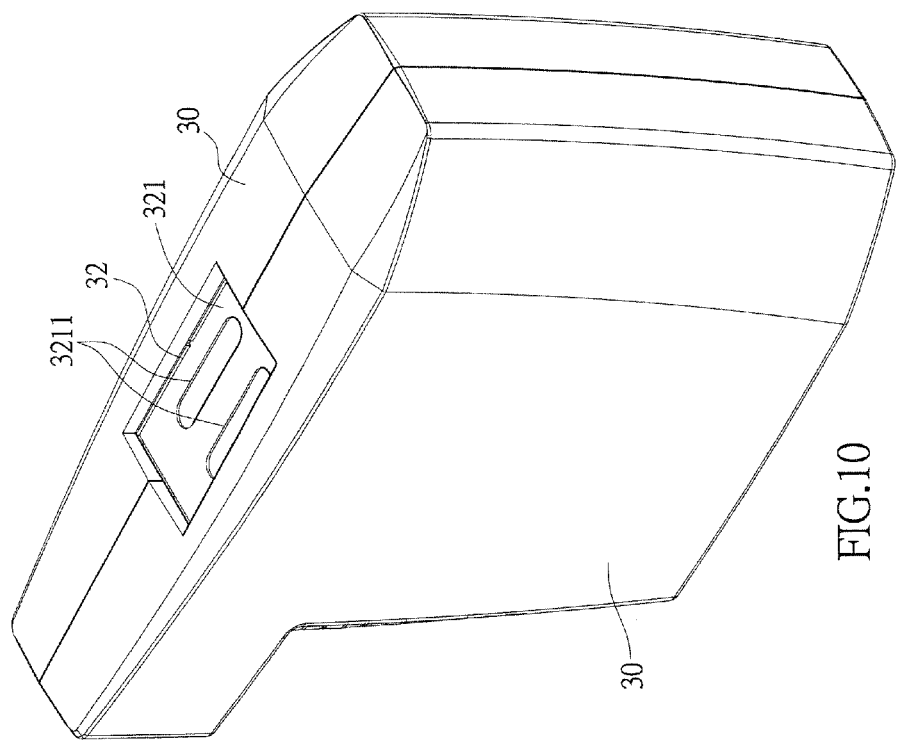
FIG. 10 is an assembled view of the optic connector cleaning apparatus in accordance with the instant disclosure.

FIG. 10 is an assembled view of the optic connector cleaning apparatus in accordance with the instant disclosure. As illustrated in FIG. 10, only the cleaning region 32 of the casing 30 is exposed after the cleaning apparatus 1 is assembled.

As illustrated in FIG. 9, one end of the cleaning tape winds about the reel axis 11c and advanced through the cleaning region 32 with the first surface 21 orienting upwards ("upwards" refers to the upward direction in figures). The cleaning tape 20 then winds about the first post axis 311c at a substantially 180-degree angle, winds about the second post axis 312c at a substantially 180-degree angle, and winds about the first post axis 311c again at a substantially 180-degree angle. Successively, the cleaning tape 20 is advanced through the cleaning region 32 with the second surface 22 orienting upwards ("upwards" refers to the upward direction in figures). Subsequently, the cleaning tape 20 is furled about the reel axis 11c. By winding the cleaning tape 20 a total of three times, and respectively about the first post axis 311c, the second post axis 312c, the advancing direction of the cleaning tape 20 is inverted such that the first surface 21 and the second surface 22 are configured adjacent and in parallel to each other in the cleaning region 32. Since the two surfaces of the cleaning tape 20 are exposed via the cleaning region 32, when cleaning the optic connector tip (ferrule end), the two surfaces of the cleaning tape 20 can be used, which is relatively economical compared to the conventional technology.

Please refer to FIGS. 1, 2, 4, 7 and 9. In the instant embodiment, the other end of the cleaning tape 20 is wound about the winding shaft 1151 of the fixing gear 115 and advanced through the slit 1113 of the outer wall 1112 of the supply slot 1111. The cleaning tape 20 advances through the first guiding inlet 3311 and abuts the guiding post 332 via the second surface 22 proximate to the cleaning region 32. The cleaning tape 20 advances between the fixed plate 321 and the frame 323, and abuts the frame 323 via the second surface 22. The first surface 21 is exposed from one opening 3211 of the fixed plate 321. The cleaning tape 20 abuts the support post 313 via the second surface 22 distal from the cleaning region 32. The cleaning tape 20 abuts a half segment of the first post 311 via the second surface 22 and winds about the first post 311 to change the direction of the advancement to be proximate to the cleaning region 32. The cleaning tape 20 abuts the second post 312 via the first surface 21 and winds about the second post 312 to change direction of the advancement to be distal from the cleaning region 32. The cleaning tape 20 then abuts the other half segment of the first post 311 via the first surface 21. The cleaning tape 20 then winds about the first post 3111 to change the direction of the advancement to be proximate to the cleaning region 32. The cleaning tape 32 advances between the fixed plate 321 and the frame 323. The cleaning tape 32 abuts the frame 323 via the first surface 21, and the second surface 22 of the cleaning tape 20 is exposed through one of the openings 3211 of the fixed plate 321. The cleaning tape 20 abuts the guiding post 332 via the first surface 21 and advances through the second guiding inlet 3312. The cleaning tape 20 then advances through the slit 1116 of the outer wall 1115 of the return slot 1114, the slit 1141 of the cover 114, and the notch 1118 of the inner wall 1117. The other end of the cleaning tape 20 is wound about the winding shaft 1121 of the driving gear 112.

As disclosed above, with the configuration of the first post 311 and the second post 312, both surfaces of the cleaning tape 20 are exposed via the cleaning region 32. As a result, a width of the cleaning tape 20 must be larger than the diameter of the optic connector tip (ferrule end), which is substantially half the width of the conventional cleaning tape. Since the width of the cleaning tape 20 is halved, the two ends of the cleaning tape 20 are furled in the housing 111 and the overall width is not excessively wide.

With the aforementioned configuration for the first bushing 3111 of the first post 311, when the cleaning tape 20 winds about a half segment of the first post 311 and advances to the second post 312, an offset is introduced to the advancement of the cleaning tape 20 such that the cleaning tape 20 can smoothly winds about the second post 311 and further advances towards the other half segment of the first post 311.

Please refer to FIGS. 1, 3, 4, and 5. When the cleaning apparatus 1 is in the first mode, the shielding 322 covers the fixed plate 321 such that the openings 3211 are not exposed. The sub-linkage 1331 of the linkage 133 abuts an end of the torsional spring 117.

Please refer to FIGS. 1, 6, 7, and 8. When the cleaning apparatus 1 is in the second mode, the key 121 is displaced towards the housing 111 such that the first swing arm 131 drives the shielding linkage 134 such that the shielding 322 is displaced away from the fixed plate 321. The second swing arm 132 drives the linkage 133. Since one end of the linkage 133 is fixed at the cover 114, the linkage 133 drives the cover 114 to rotate and the sub-linkage 1331 of the linkage 133 drives the torsional spring 117 such that the torsional spring 117 is displaced to a different inner tooth of the inner teeth 1122. With the slanted angle of the inner teeth 1122, the torsional spring 117 passes through the teeth such that the torsional spring 117 is twisted to generate torsion. Since the elastic body 122 between the key 121 and the spacer 123 has a compressional spring-back force (under compression) and the torsional spring 117 is twisted and having a torsional force in the second mode, the cleaning apparatus 1 can automatically returns to the first mode. When the key 121 returns to the first mode, the driving gear 112 drives the winding shaft 1121 to furl the cleaning tape 20. When the cleaning apparatus 1 is in the second mode, the wall of slit 1141 of the cover 114 abuts the cleaning tape 20 between the inner wall 117 and the outer wall 115 such that the rotational of the cover 114 drives the cleaning tape 20 to furl. Since the cleaning tape 20 is a continuous body, the cleaning tape 20 can smoothly pull and rotate the fixing gear 115 until the desired positioning is reached to cease motion. In the instant embodiment, the cleaning tape 20, which has advanced through the cleaning region 32, is stored in the return slot 1114 and wound about the winding shaft 1121 of the driving gear 112. The cleaning tape 20, which has not yet advanced through the cleaning region 32, is stored in the supply slot 1111 and wound on the winding shaft 1151 of the fixing gear 115. Since the dimension of the outer diameter and the rotational angle of the cover 114 are fixed, the length of cleaning tape 20 which are wound up from each rotation of the cover 114 is also fixed such that the replacement of the cleaning tape 20 is economical. When the cover 114 is reversed in rotation, the torsional spring 117 is not affected in rotation. When the cleaning tape 20 stored in the return slot 1114 reaches a predetermined outer diameter such that the furling angle of the torsional spring 117 is relatively small, the slanted angle of the inner tooth 1122 (as shown in FIG. 3) provides a resistance force which reverses the cover 114. The outer diameter and the rotational angle of the cover 114 can be designed based on the length of the cleaning region 32 and are not limited hereto.

Figure 11:
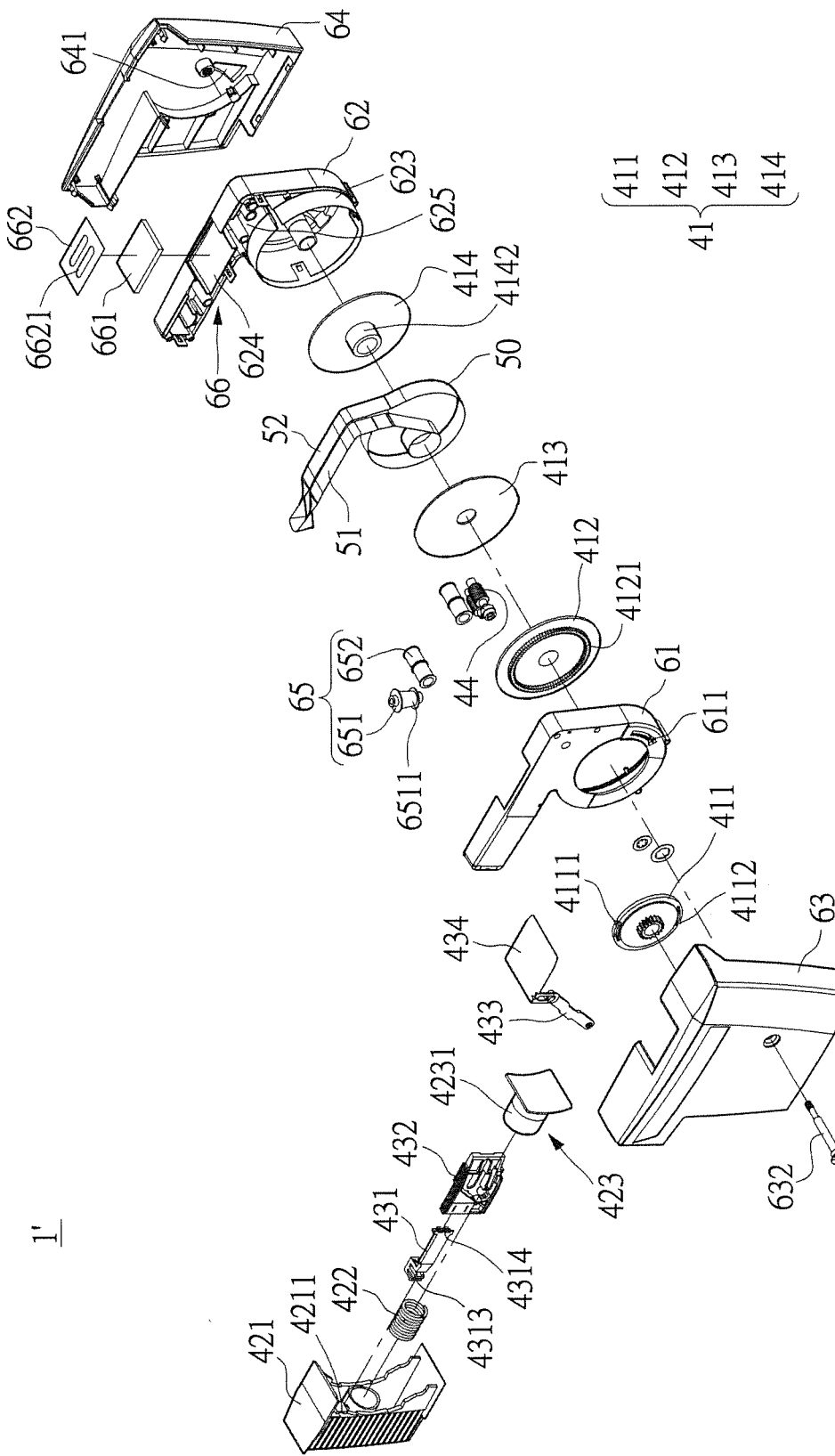
FIG. 11 is an exploded view of the optic connector cleaning apparatus in accordance with another embodiment of the instant disclosure.
Figure 12:
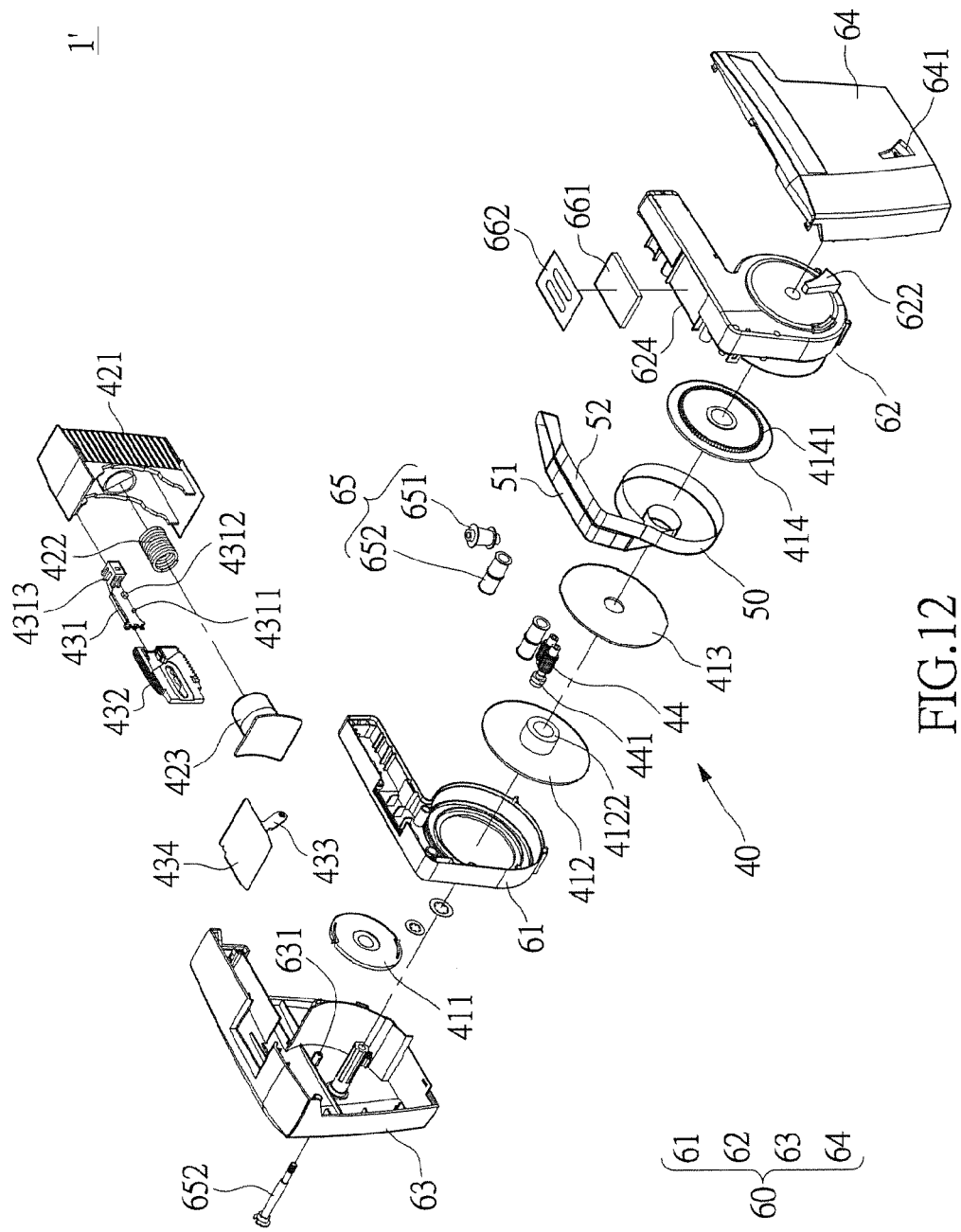
FIG. 12 is another exploded view of the optic connector cleaning apparatus in accordance with another embodiment of the instant disclosure.
Figure 13:
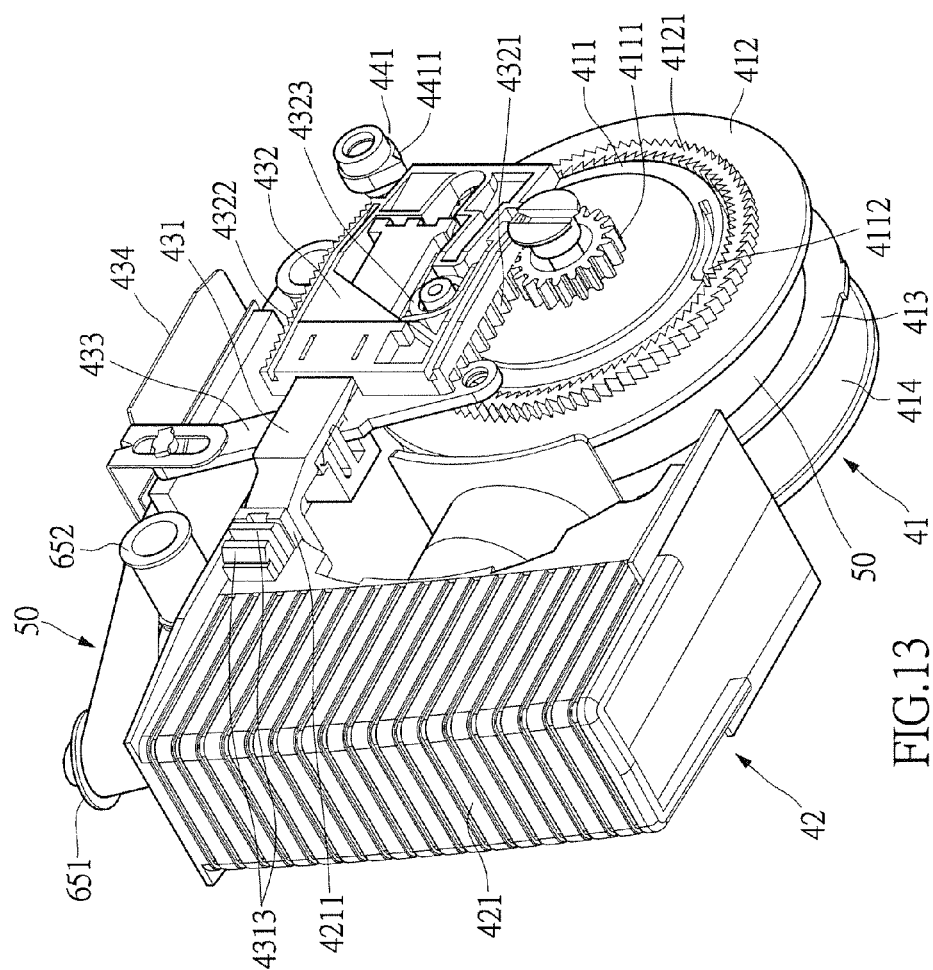
FIG. 13 is a perspective view of the optic connector cleaning apparatus illustrating a first mode in accordance with another embodiment of the instant disclosure.
Figure 14:
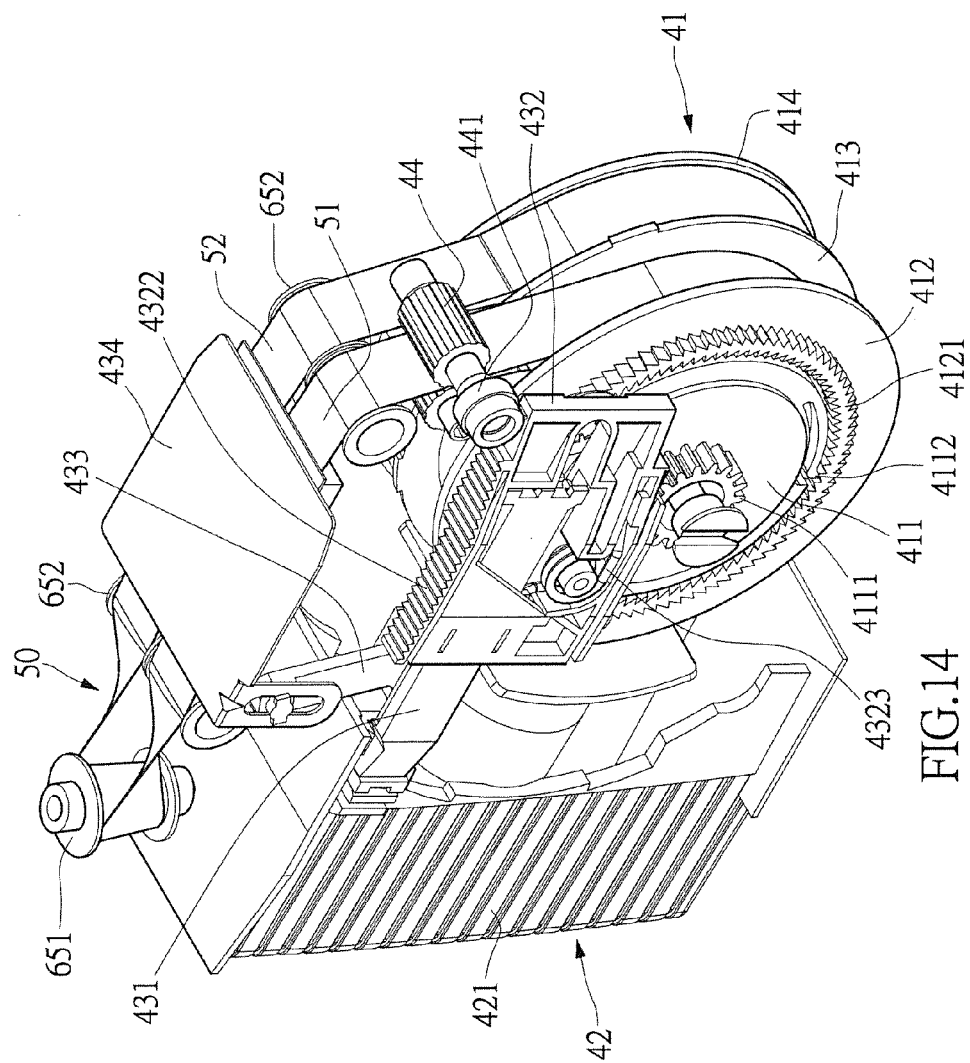
FIG. 14 is another perspective view of the optic connector cleaning apparatus illustrating the first mode in accordance with another embodiment of the instant disclosure.
Figure 15:
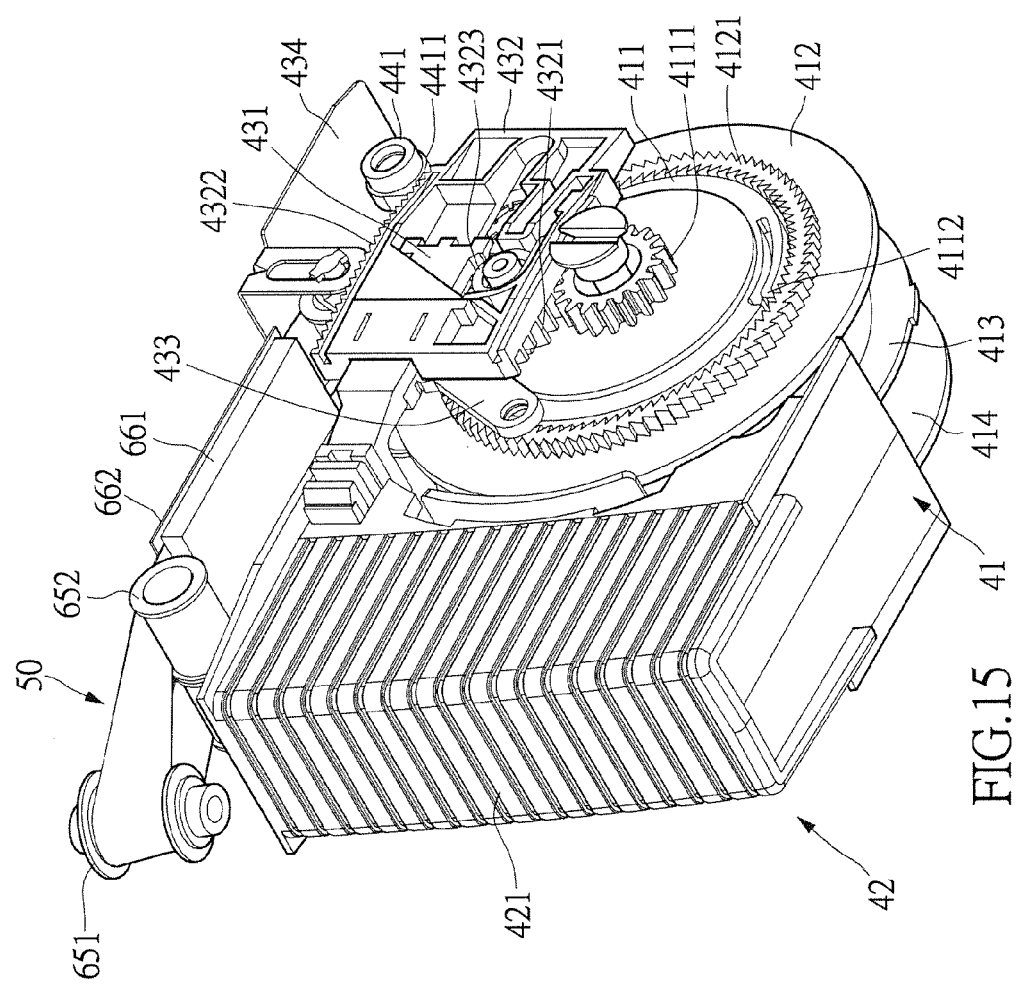
FIG. 15 is a perspective view of the optic connector cleaning apparatus illustrating a second mode in accordance with another embodiment of the instant disclosure.
Figure 16:
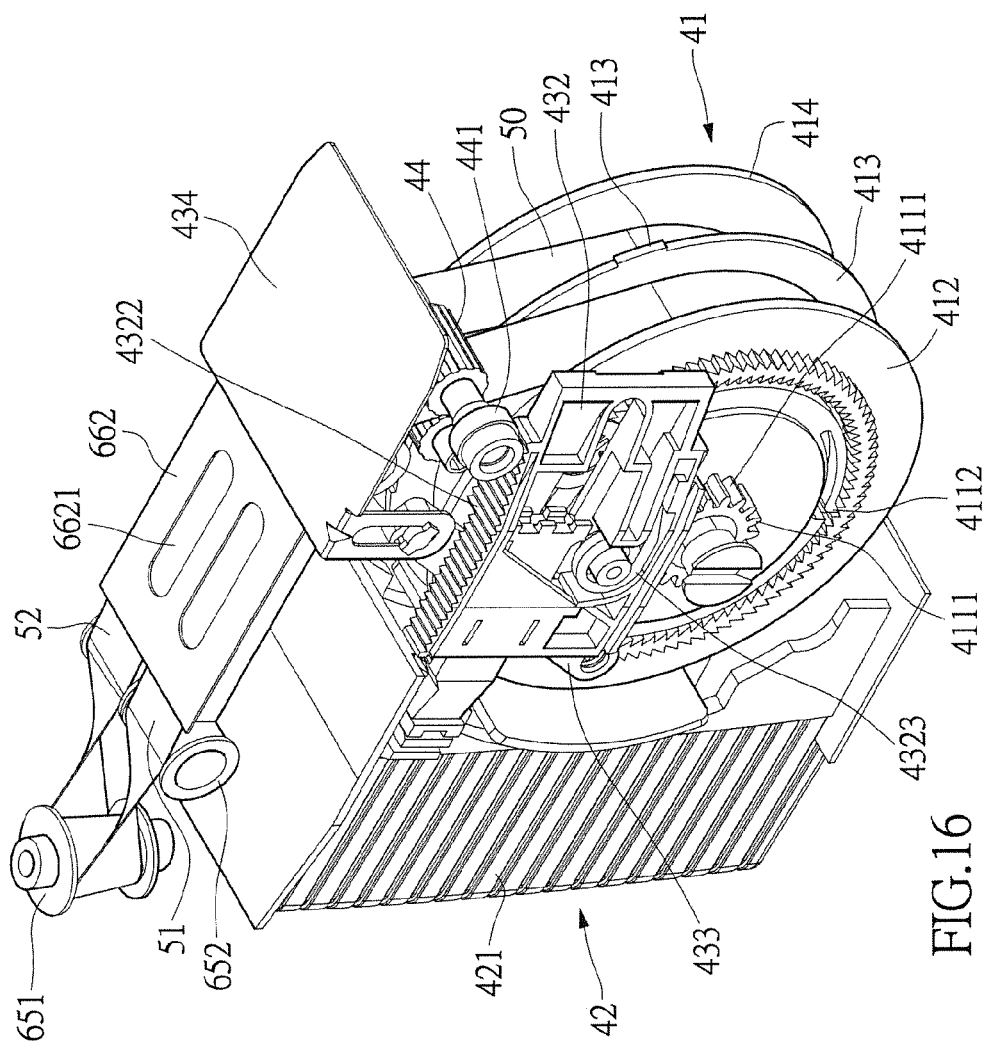
FIG. 16 is another perspective view of the optic connector cleaning apparatus illustrating the second mode in accordance with another embodiment of the instant disclosure.
Figure 17:
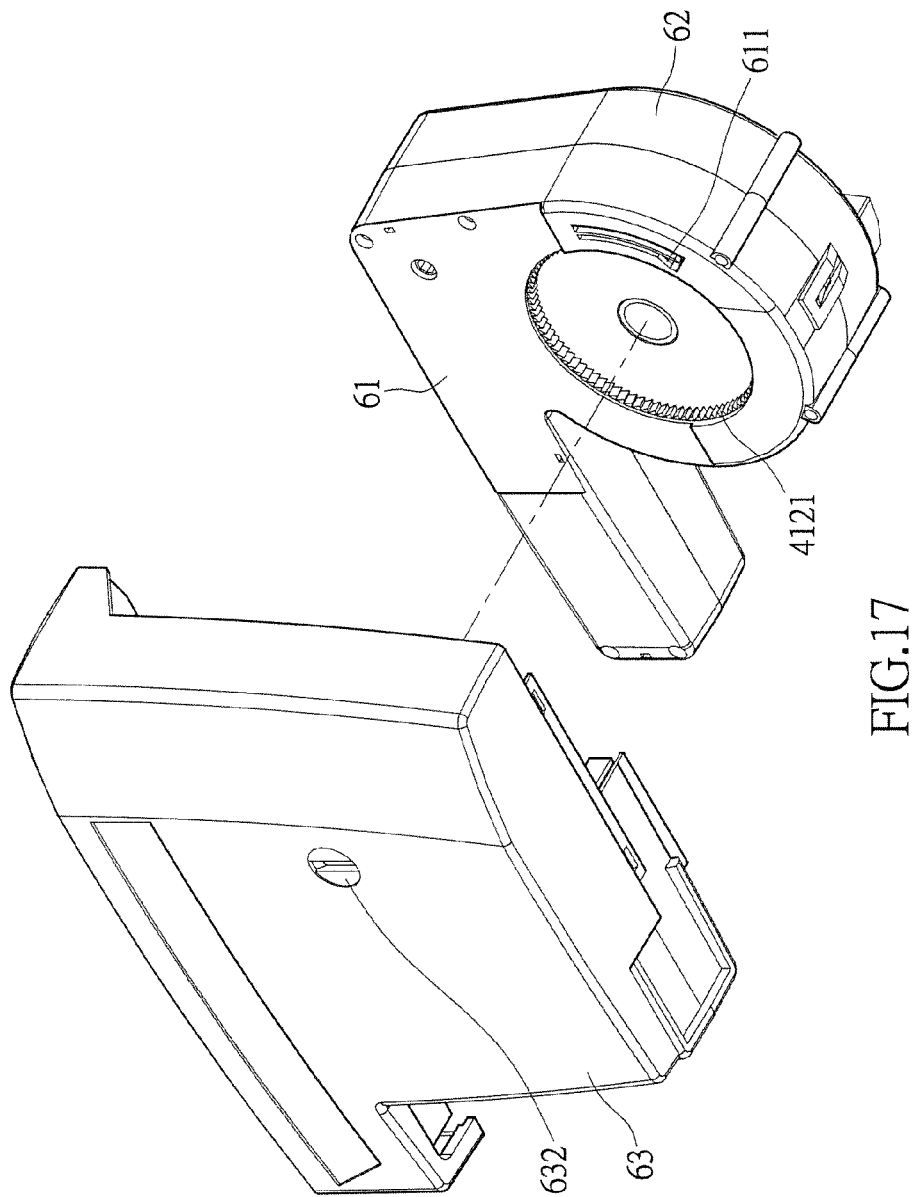
FIG. 17 is another perspective view of the optic connector cleaning apparatus illustrating a housing and a casing in accordance with another embodiment of the instant disclosure.
Figure 18:
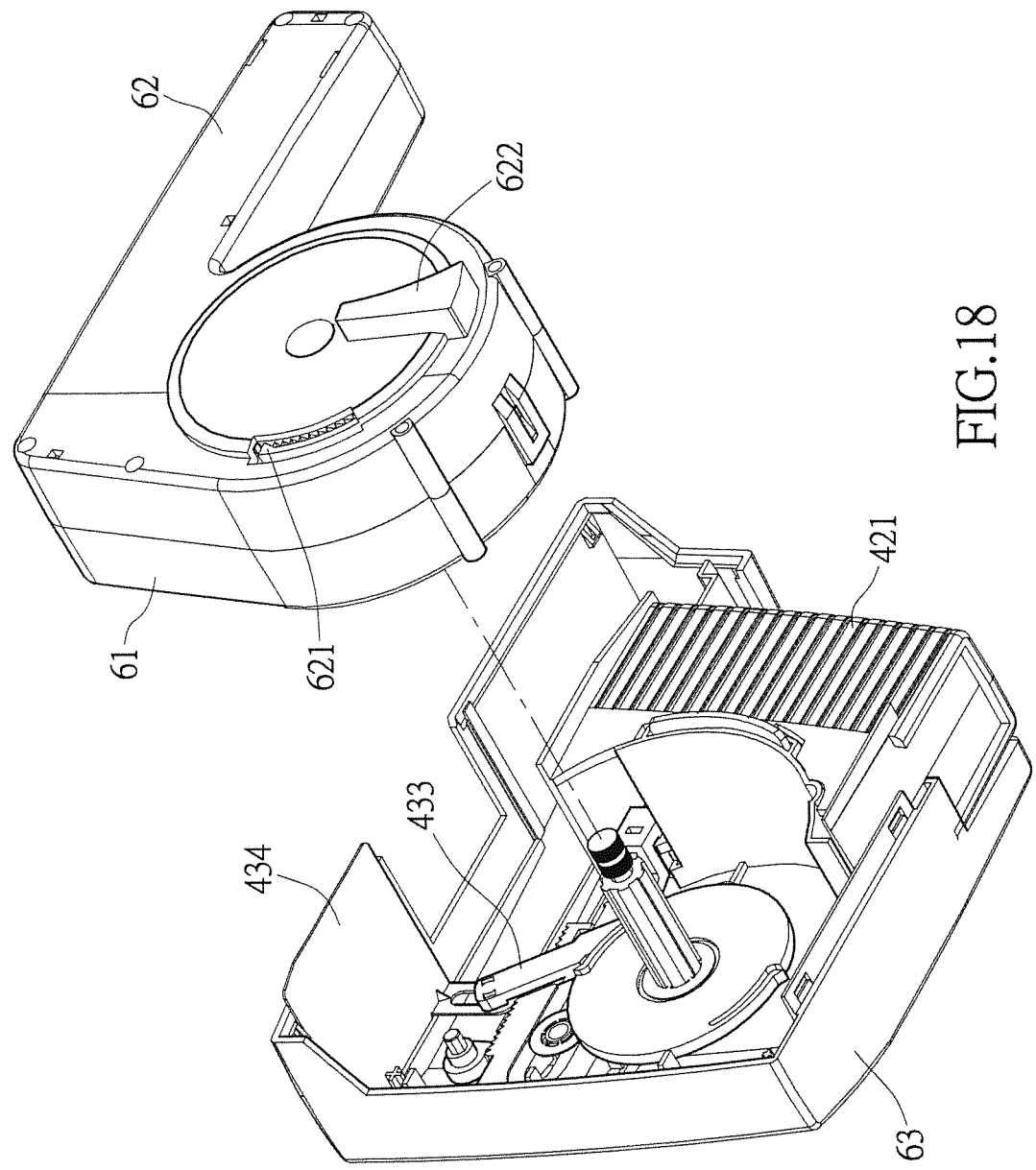
FIG. 18 is a perspective view of the optic connector cleaning apparatus illustrating a housing and a casing in accordance with another embodiment of the instant disclosure.

Please refer to FIGS. 11 and 12 as another embodiment of optic connector cleaning apparatus 1'. The optic connector cleaning apparatus 1' includes a driving module 40, a cleaning tape 50, and a housing 60. Portions of the cleaning tape 50 winds about the driving module 40. The driving module 40 and the cleaning tape 50 are disposed in the housing 60. The cleaning tape 50 is partially exposed from the housing 60. Similar to the previous embodiment, the cleaning tape 50 has a first surface 51 and the second surface 52.

As shown in FIGS. 11, and 12, the driving module 40 includes a reel assembly 41, a pressable portion 42, an advancing module 43, and two frictional wheels 44. The pressable portion 42 and the advancing wheel 43 are connected to each other. The reel assembly 41 and the friction wheels 44 respectively connected to the advancing module 43. The reel assembly 41 includes a driving disk 411, a return disk 412, a spacer 413, and a fixing disk 414. The driving disk 411 is disposed on a side of the return disk 412 and the fixing disk 414 is disposed on the other side of the return disk 412. The spacer 413 is disposed between the fixing disk 414 and the return disk 412. The driving disk 411, return disk 412, spacer 413, and the fixing disk 414 are aligned in a common central axis, which is the rotating axis of the reel assembly 41. A side of the driving disk 411 facing away from return disk 412 has a gear 4111 arranged thereon. The gear 4111 and the driving disk 411 have a common center. The gear 4111 is substantially configured at the center of the driving disk 411, a peripheral portion of the driving disk 411 has at least one abutting gear 4112 arranged thereon, and the abutting gear 4112 is a beveled (oblique) gear teeth.

A side of the return disk 412 facing the driving disk 411 has a gear ring 4121 arranged thereon, the gear ring 4121 and the return disk 412 have a common center. The gear ring 4121 has an inner diameter substantially equals to an outer diameter of the driving disk 411. The gear ring 4121 has a plurality of inner teeth and outer teeth, of which both the inner and outer teeth are beveled (oblique) towards the same direction. A side of the return disk 412 facing the fixing disk 414 has a return shaft 4122 arranged on the center of the return disk 412. The return shaft 4122 and the return disk 412 have surfaces substantially normal to each other. A side of the fixing disk 414 facing away from the return disc 412 has a fixing gear 4141. The number of teeth and module of the fixing gear 4141 are substantially the same as the outer teeth of the gear ring 4121. A side of the fixing disk 414 facing toward the return disk 412 has a winding shaft 4142 arranged on the center of the fixing disk 414.

The pressable portion 42 includes a key 421, a spring 422, and a spacer 423. The spring 422 is disposed between the spacer 423 and the key 421. A side of the spacer 423 facing the key 421 has a hollow cylinder 4231 arranged thereon. The spring 422 is disposed in the hollow cylinder 4231, and an end of the spring 422 abuts the key 421. The other end of the spring 422 abuts the spacer 423. The spacer 423 has an arced surface. A side of the key 421 has a connecting block 4211 arranged thereon proximate to the spacer 423.

The advancing module 43 includes an advancing shaft 431, an advancing block 432, a shielding linkage 433, and a shielding 434. The advancing shaft 431 connects to the advancing block 432 and the shielding linkage 433. An end of the shielding linkage 433 is coupled to the shielding 434. The advancing shaft 431 has a flat-shaped body. A side of the advancing shaft 431 has a first advancing protrusion 4311 and a second advancing protrusion 4312 spaced apart from each other. An end of the advancing shaft 421 has two connecting plates 4313 arranged thereon. The two connecting plates 4313 face each other and are spaced apart. A protrusion 4313 is extended from the other end of the advancing shaft 431. The protrusion 4313 has a width larger than an average width of the advancing shaft 431. Two sides of the advancing block 432 parallel to the advancing shaft 431 respectively has a first gear strip 4321 and a second gear strip 4322. The first gear strip 4321 is a straight strip of tooth, and the second gear strip 4322 is a beveled (oblique) strip of tooth. The advancing block 432 has a torsion spring 4323 arranged therein. The shielding linkage 433 is disposed between the first advancing protrusion 4311 and the second advancing protrusion 4312. The advancing shaft 431 can be removably inserted in the advancing block 432.

The friction wheel 44 has flat teeth arranged on the outer surface thereof. Two friction wheels 44 are spaced apart by a predetermined distance, and the distance is the same as the width of the cleaning tape 50. An end of the friction wheel 44 has a counter wheel 441 arranged thereon. The counter wheel 441 and the friction wheel 44 are coaxial. The counter wheel 441 has a protruding tooth 4411 arranged thereon The housing 60 includes a first housing 61, a second housing 62, a first casing 63, a second casing 64, and an inverting structure 65. The first and second housings 61, 62 are coupled to form a chamber therebetween. The inverting structure 65 is disposed in the chamber. The first and second casings 63, 64 are coupled to form another chamber therebetween. The coupled first and second housings 61, 62 are disposed in the chamber formed by the first and second casings 63, 64. The front housing 61 has a first housing tooth 611 arranged thereon. The first housing tooth 611 has identical module as the outer teeth of the gear ring 4121 of the return disk 412. The second housing 62 has a second housing tooth 621, a transparent portion 622, and a slot 623. The second housing tooth 621 of the second housing 62 and the first housing tooth 611 of the first housing 61 are substantially identical. The slot 623 is arranged on the second housing 62 and between the second and first housing 61, 62. The slot 623 is defined by a ring-shaped wall which has a radius relatively larger than a radius of the reel assembly 41. The second casing 64 has a case opening 641 arranged thereon corresponding to the transparent portion 622. The coupled first and second housings 61, 62 cooperatively form an opening. The opening which exposes the first housing 61 and the space defined within the second housing 62 cooperatively defines as a substantially rectangular shape cleaning region 66. The second housing 62 has a support surface 624 arranged thereon corresponding to the cleaning region 66. A support plate 661 is disposed on the support surface 624, and a fixed plate 662 is disposed on the support plate 661. The fixed plate 662 has two rectangular-shaped openings 6621 arranged thereon in parallel. The longitudinal direction of each opening 6621 is in parallel with the longitudinal direction of the cleaning region 66. In other words, the two openings 6621 align directly with the cleaning region 66. The second housing 62 and the first housing 61 cooperatively define a return region 625 proximate to a side of the slot 623.

The inverting structure 65 includes an inverting shaft 651 and two driving shafts 652. The driving shafts 652 are disposed on a surface of the second housing 62 facing the first housing 61. The driving shafts 652 are respectively configured on two sides of the support surface 624. The extending direction of the driving shafts 652 is parallel to the relatively shorter side of the cleaning region 66. The inverting shaft 651 and the driving shafts 652 are configured in an angle each other. The extending direction of the inverting shaft 651 aligns with a normal direction to the plane of the support surface 624. The extending direction of the inverting shaft 651 and the normal direction to the plane of the support surface 624 may also be configured with an angle therebetween. A center portion of the inverting shaft 651 has a tapered portion 6511. An end of the tapered portion 6511 proximate to the opening has a relatively large diameter whereas the end of the tapered portion 6511 distal from the opening has a relatively smaller diameter.

The reel assembly 41 is disposed in the slot 623 of the second housing 62. The fixing disk 414 of the reel assembly 41 is configured relatively closer to the second housing 62, whereas the driving disk 411 is configured relatively closer to the first housing 61. The first housing tooth 611 of the first housing 61 directionally wedges against the gear ring 4121 of the return disk 412. The second housing tooth 621 of the second housing 62 directionally wedges against the fixing gear 4141 of the fixing disk 414.

One end of the cleaning tape 50 is wounded about the return shaft 4122 of the return disk 412. The cleaning tape 50 is advanced pass a half segment of the driving shaft 652, and then further advanced through the cleaning region 66 between the fixed plate 662 and the support plate 661. The first surface 51 of the cleaning tape 50 is exposed through one of the openings 6621 of the fixed plate 662, and then advanced pass the other half segment of the driving shaft 652. The cleaning tape 50 is then twisted at an angle such that the first surface 51 of the cleaning tape 50 wound about half of the tapered portion 6511 of the inverting shaft 651. The cleaning tape 50 is further twisted at another angle, then further advanced pass the other half segment of the driving shaft 652, and successively advanced through the cleaning region 66 between the fixed plate 662 and the support plate 661. The second surface 52 of the cleaning tape 50 is exposed through the other opening 6621 of the fixed plate 662. The cleaning tape 50 is then advanced pass the other half segment of the driving shaft 652. The other end of the cleaning tape 50 is wound about the winding shaft 4142 of the fixing disk 414. Due to the configuration of the inverting shaft 651, the first and second surfaces 51, 52 of the cleaning tape 50 are respectively exposed through the two openings 6621 of the fixed plate 662. Since the inverting shaft 651 has the tapered portion 6511 arranged thereon, the cleaning tape 50 can be stably disposed on the inverting shaft 651.

The first casing 63 has a fixing element 632. The fixing element 632 passes through the first casing 63, the first housing 61, the center of the reel assembly 41, the second housing 62, and is fixed at the second casing 64. The reel assembly 41 can stably and rotably dispose in the first and second housings 61, 62.

Portions of the cleaning tape 50 are wound about the return shaft 4124 of the return disk 412. A portion of the cleaning tape 50 is in the cleaning region 66, the other portion of the cleaning tape 50 is wound about the winding shaft 4142 of the fixing disk 414. In the instant disclosure, cleaning tape 50 not yet passed through the cleaning region 66 (in other words, clean tape) is wound about the winding shaft 4142 of the fixing disk 414. Cleaning tape 50 already passed through the cleaning region 66 (in other words, used tape) is wound about the return shaft 4122 of the return disk 412. The spacer 413 is configured between the return disk 412 and the fixing disk 414. In other words, the spacer 413 separates the clean cleaning tape 50 and the used cleaning tape 50 such that the clean cleaning tape 50 are not contaminated by the used cleaning tape 50. The fixing disk 414 can be made of transparent materials such that users can determine the quantity of the remaining clean cleaning tape 50 by being able to observe the clean cleaning tape 50 between the fixing disk 414 and the spacer 413 via the transparent portion 622 of the second housing 62 and the case opening 641 of the second housing 64.

The connecting block 4211 and the pressable portion 421 are spaced apart to define a gap therebetween. Two connecting plates 4313 of the advancing shaft 431 are disposed between the gap. When the advancing shaft 431 and the pressable portion 421 are connected, the advancing shaft 431 displaces as the pressable portion 421 displaces. In other words, the displacement directions of the advancing shaft 431 and the pressable portion 421 are identical. Since the two connecting plates 4313 are spaced apart, the two connecting plates 4313 have a certain degree of flex. Thus, the two connecting plates 4313 can be elastically disposed in the gap between the connecting block 4211 and the pressable portion 421. The first gear strip 4321 of the advancing block 432 abuts the gear 4111 of the driving disk 411. The spacer 423 presses against the slot 623 of the second housing 62. An end of the shielding linkage 433 is coupled to a surface of the first casing 63 facing the second casing 64. The other end of the shielding linkage 433 is coupled to the shielding 434 such that the shielding 434 can be removably disposed on the fixed plate 662 and in the return region 625.

The optic connector cleaning apparatus 1' has a first mode and a second mode. When the optic connector cleaning apparatus 1' is in the first mode, the spring 422 between the pressable portion 421 and the spacer 423 is in its natural state or with the least amount of compression. The shielding 434 is disposed on the fixed plate 662.

When the optic connector cleaning apparatus 1' is in the second mode, the spring 422 between the pressable portion 421 and the spacer 423 has a compression force. The shielding 424 is disposed over the support surface 624, and the protruding tooth 4411 of the counter wheel 441 abuts the second gear strip 4322 of the advancing block 432.

When the optic connector cleaning apparatus 1' is in the first mode, user may apply a force on the pressable portion 421 such that the pressable portion 421 advances towards the reel assembly 41. The spring 422 then retains a compression force. As the pressable portion 421 advances, the advancing shaft 431 is driven, and as the first advancing protrusion 4311 of the advancing shaft 431 also drives the advancing block 432 such that the advancing shaft 431, the advancing block 432 and the pressable portion 421 displace in the same general direction. The first gear strip 4321 of the advancing block 432 drives the gear 4111. In other words, through the linear displacement of the first gear strip 4321 of the advancing block 432 against the gear 4111, the linear displacement is translated into rotational motion of the driving disk 411 about the fixing element 632 as an axle of rotation. The abutting gear 4112 of the driving disk 411 drives the inner teeth of the gear ring of the return disk 412, such that the return disk 412 rotates the return shaft 4122 and furls the cleaning tape 50. As the cleaning tape 50 is in rotation, the cleaning tape 50 continues to expose different portions thereof via the opening 6621 of the fixed plate 662 and continues to pull the cleaning tape 50 advancing through the fixing disk 414 and the spacer 413.

Since the two friction wheels 44 clamp the cleaning tape 50 therebetween, as the cleaning tape 50 is in motion, the friction wheels 44 are driven to rotate, and such rotation leads the counter wheel 441 to rotate. Meanwhile, the protruding tooth 4411 of the counter wheel 441 abuts the second gear strip 4322 of the advancing block 432 in a specific direction such that the protruding tooth 4411 can limit the displacement of the advancing block 432 to a certain degree. Since the rotational motion of the friction wheel 44 is driven by the movement of the cleaning tape 50, radius of the friction wheel 44 remains unchanged. The driving length of the cleaning tape 50 is directly translated as the rotational angle of the friction wheel 44. The counter wheel 441 and the friction wheel 44 have the same rotational angle. In other words, after a certain length of the cleaning tape 50 has unfurled, the protruding tooth 4411 of the counter wheel 441 can prevent the advancing block 432 from further advancing and prevent the return disk 412 from furling excessive cleaning tape 50.

As aforementioned, the first advancing protrusion 4311 of the advancing shaft 431 pushes the advancing block 432 while the second advancing protrusion shaft 4312 of the advancing shaft 431 pushes the shielding linkage 433. One end of the shielding linkage 433 is fixed at the first casing 63 and the other end of the shielding linkage 433 is displaced by the advancing shaft 431. In other words, the other end of the shielding linkage 433 drives the shielding 434 to the return region 625. Thus, the cleaning tape 50 can be cleaned by the optical connector via the openings 6621 of the fixed plate 662.

When the optic connector cleaning apparatus 1' has been used for a certain period of time, used cleaning tape 50 begins to accumulate. At such time, a radius of the cleaning tape 50 between the return disk 412 and the spacer 413 becomes relatively large, so a slight rotation of the return disk 412 can provide the preferred length of the cleaning tape 50. When the rotational angle of the return disk 412 becomes small, in other words, the displacement distance of the advancing block becomes relatively small, thus, the displacement distance of the key 421 and the advancing shaft 431 also becomes relatively small. However, when the displacement distance of the advancing shaft 431 becomes small, the shielding 434 cannot be displaced to the return region 625 via the shielding linkage 433. Since one end of the torsion spring 4323 is fixed at the advancing block 432 and the other end of the torsion spring 4323 is fixed at the advancing shaft 431, when the advancing block 432 is not in motion, the torsional spring 4323 can drive the advancing shaft 431 and indirectly drives the shielding linkage 433. As a result, the shielding 434 can be displaced to the return region 625.

As aforementioned, the optic connector cleaning apparatus of the instant disclosure 1' can smoothly transition from the first mode to the second mode via the advancing shaft 431, advancing block 432, reel assembly 41, friction wheel 44, counter wheel 441, shielding linkage 433, and the torsion spring 4323.

When the optic connector cleaning apparatus 1' is in the second mode, user may apply less force onto the key 421. The resilience in the spring 422 provides displacement of the key 421 as transitioning to the first mode, thus, the advancing shaft 431 is displaced toward its position in the first mode. The protrusion 4314 of the advancing shaft 431 drives the advancing block 432 toward its position in the first mode. The advancing block 432 drives the rotation of the driving disk 411 via the first gear strip 4321 and the gear 4111, at such time, the rotation direction of the driving disk 411 differs from the rotation direction thereof when transitioning from the first mode to the second mode. Since the driving disk 411 is directionally wedged to the inner teeth of the gear ring 4121 of the return disk 412 in a specific direction, the driving disk 411 cannot drive the return disk 412. Moreover, since the outer teeth of the gear ring 4121 of the return disk 412 is directionally wedged to the first housing tooth 611 of the first housing 61, the first housing tooth 611 can prevent the return disk 412 from rotating. The fixing disk 414 can also be fixed by the second housing tooth 621 of the second housing 62 to prevent fixing disk 414 from rotating. Meanwhile, the first advancing protrusion 4311 of the advancing shaft 431 pushes the shielding linkage 433 such that the shielding linkage 433 swings toward its position in the first mode. Thus, the shielding 434 is configured above the fixed plate 662.

Via the optic connector cleaning apparatus of the instant disclosure, the following improvements are provided. The inverting structure provides economical usage of both sides of the cleaning tape to prevent excess waste. The first bushings of the first post provide smooth advancement of the cleaning tape. Moreover, since the width of the cleaning tape is reduced in half, the overall width of the optic connector cleaning apparatus is more appropriate. Furthermore, since the housing can simultaneously furl the cleaning tape which has not yet passed through the cleaning region, and the cleaning tape which has passed through the cleaning region, the overall size of the optic connector cleaning apparatus is reduced. In addition, since the cover can be rotatably disposed in the housing, furling length of the cleaning tape is consistently pulled. Moreover, users can simply press the key to transition the optic connector cleaning apparatus between the first and the second mode through the advancing module and the reel assembly. Furthermore, excessive furling of the cleaning tape can be prevented through the configuration of the friction wheel, counter wheel and the second gear strip. In addition, the shielding can be smoothly displaced from the fixed board to the return slot through the configuration of the torsion spring and the advancing shaft. Moreover, the cleaning tape can invert surfaces by winding about the inverting shaft, and configuration between inverting shaft and the support surface, specifically via the extending direction of the inverting shaft which aligns with a normal direction to the plane of the support surface 624.

The figures and descriptions supra set forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What is claimed is:

1. An optic connector cleaning apparatus, comprising:
a driving module including a reel assembly;
a cleaning tape including a first surface and a second surface opposite from the first surface, the cleaning tape partially wound at the reel assembly; and
a casing including an inverting structure and a cleaning region, the cleaning tape partially wound at the inverting structure;
wherein the inverting structure includes a first post and a second post, the first post has two half segments defined by a plane normal to an axis of the first post, the second surface of the cleaning tape winds about substantially a half segment of the first post, the first surface of the cleaning tape winds about an end of the second post and the other half segment of the first post proximate to the cleaning region;
wherein the first surface of the cleaning tape is partially exposed through the cleaning region, and the cleaning tape is partially wound at the inverting structure for partially exposing the second surface of the cleaning tape through the cleaning region.

2. The optic connector cleaning apparatus as recited in claim 1, wherein an end of the cleaning tape is wound at a side of the reel assembly, the first surface of the cleaning tape is partially exposed through a side of the cleaning region, the cleaning tape is inverted after winding through the inverting structure, the second surface of the cleaning tape partially exposed from the other side of the cleaning region, the first surface and the second surface of the cleaning tape are configured in parallel and adjacent to each other at the cleaning region, and the other end of the cleaning tape is wound at the other side of the reel assembly.

3. The optic connector cleaning apparatus as recited in claim 1, wherein each of the two half segments of the first post resembles a cone and the larger cross-sectional radii of the cone-shaped half segments orient towards each other.

4. The optic connector cleaning apparatus as recited in claim 1, wherein the first post and the second post each has a bushing sleeved thereon.

5. The optic connector cleaning apparatus as recited in claim 1, wherein the casing further includes a guiding structure configured between the cleaning region and the reel assembly.

6. The optic connector cleaning apparatus as recited in claim 5, wherein the guiding structure includes a divider having a first guiding inlet and a second guiding inlet, the second guiding inlet is formed between the divider and the cleaning region, the cleaning tape is advanced through the second guiding inlet, and the cleaning tape is wound at the reel assembly through the first guiding inlet.

7. The optic connector cleaning apparatus as recited in claim 1 further including a fixed plate, wherein the fixed plate is disposed in the cleaning region, two sides of the fixed plate each has an opening formed thereon, the first surface and the second surface of the cleaning tape are respectively exposed from the openings of the two sides of the fixed plate.

8. The optic connector cleaning apparatus as recited in claim 7, wherein the cleaning region further includes a shielding movably configured over the fixed plate.

9. The optic connector cleaning apparatus as recited in claim 7, wherein the reel assembly further includes a pressable portion and a linkage structure, one end of the linkage structure is coupled with the pressable portion, and the other end of the linkage structure is coupled with the reel assembly.

10. The optic connector cleaning apparatus as recited in claim 9, wherein the linkage structure includes a shielding linkage, one end of the shielding linkage is coupled with the pressable portion, and the other end of the shielding linkage is coupled with the shielding.

11. The optic connector cleaning apparatus as recited in claim 10, wherein the supply slot is defined by a bottom wall and an outer wall, the outer wall has a slit formed thereon, and the cleaning tape is advanced out of the supply slot through the slit.

12. The optic connector cleaning apparatus as recited in claim 10, wherein the return slot is defined by a bottom wall and an outer wall, the outer wall has a slit formed thereon, and the cleaning tape is advanced into the return slot through the slit.

13. The optic connector cleaning apparatus as recited in claim 12, wherein the return slot is further defined by an inner wall, the inner wall and the outer wall are spaced with a gap therebetween, and the cover is disposed in the gap.

14. The optic connector cleaning apparatus as recited in claim 1, wherein the reel assembly further includes a housing and a cover, two sides of the housing have portions respectively defining a supply slot and a return slot, the cleaning tape is received in the supply slot before advancing through the cleaning region and is received in the return slot after advancing through the cleaning region, and the cover is rotatably coupled to the return slot.

15. The optic connector cleaning apparatus as recited in claim 1, wherein the inverting structure includes an inverting shaft, the casing has a support surface configured in the cleaning region, an extending direction of the inverting shaft is normal to the plane of the support surface, the cleaning tape between the cleaning region and the inverting shaft is twisted at an angle, and the first surface of the cleaning tape is in contact with the inverting shaft.

16. The optic connector cleaning apparatus as recited in claim 15, wherein the inverting shaft has a tapered portion, and the cleaning tape winds about the tapered portion.

17. The optic connector cleaning apparatus as recited in claim 1, wherein the reel assembly includes a pressable portion and an advancing module connected to the pressable portion, the advancing module and the pressable portion displace in the same direction, and the advancing module abuts the rotatable reel assembly.

18. An optic connector cleaning apparatus, comprising:
a driving module including a reel assembly;
a cleaning tape including a first surface and a second surface opposite from the first surface, the cleaning tape partially wound at the reel assembly; and
a casing including an inverting structure and a cleaning region, the cleaning tape partially wound at the inverting structure;
wherein the first surface of the cleaning tape is partially exposed through the cleaning region, and the cleaning tape is partially wound at the inverting structure for partially exposing the second surface of the cleaning tape through the cleaning region;
wherein the reel assembly includes a pressable portion and an advancing module connected to the pressable portion, the advancing module and the pressable portion displace in the same direction, and the advancing module abuts the rotatable reel assembly;
wherein the driving module further includes a friction wheel having a counter wheel coaxially extending from the friction wheel, one surface of the cleaning tape is in contact with the friction wheel, and the counter wheel directionally wedges against a side of the advancing module.

19. The optic connector cleaning apparatus as recited in claim 18, wherein the reel assembly includes a driving disk and a return disk, the driving disk has a gear arranged thereon, a circumferential portion of the driving disk has an abutting gear arranged thereon, a surface of the return disk has a gear ring arranged thereon, the abutting gear directionally abuts the gear ring, the other surface of the return disk has a return shaft, and portions of the cleaning tape winds about the return shaft.

20. The optic connector cleaning apparatus as recited in claim 19, wherein the advancing module includes an advancing shaft and an advancing block, a side of the advancing shaft has a first advancing protrusion, an end of the advancing shaft is connected to the pressable portion, the advancing shaft pushes the advancing block, the advancing block and the pressable portion displace in parallel, the advancing block has a first gear strip arranged on a side thereof proximate to the gear, and the first gear strip abuts the gear of the driving disk.

21. The optic connector cleaning apparatus as recited in claim 20, wherein the friction wheel and the counter wheel coaxially rotate, a peripheral portion of the counter wheel protrudes to form a protruding tooth, the other side of the advancing block has a second gear strip arranged thereon, the protruding tooth abuts second gear strip of the advancing block.

22. The optic connector cleaning apparatus as recited in claim 21, wherein the advancing block has a torsion spring, one end of the torsion spring is fixed at the advancing block, and the other end of the torsion spring is fixed at the advancing shaft.

* * * * *